United States Patent
Tobolka

(10) Patent No.: US 6,539,692 B1
(45) Date of Patent: Apr. 1, 2003

(54) FORM, FILL AND SEAL CONTAINER FORMING APPARATUS

(75) Inventor: Stefan Tobolka, Inglewood (CA)

(73) Assignee: Siptop Packaging, Inc., Ontario (CA)

( * ) Notice: Subject to any disclaimer, the term of this patent is extended or adjusted under 35 U.S.C. 154(b) by 0 days.

(21) Appl. No.: 09/307,118

(22) Filed: May 7, 1999

Related U.S. Application Data

(63) Continuation-in-part of application No. 09/216,607, filed on Dec. 18, 1998, now abandoned.

(51) Int. Cl.$^7$ .............................. B65B 9/20; B65B 51/30
(52) U.S. Cl. ........................................ 53/551; 53/374.8
(58) Field of Search ...................... 53/551, 552, 374.8, 53/372.6; 219/243, 460.1

(56) References Cited

U.S. PATENT DOCUMENTS

| | | | |
|---|---|---|---|
| 2,339,896 A | 1/1944 | Waters | 226/56 |
| 2,374,793 A | 5/1945 | Waters | 93/3 |
| 2,460,460 A * | 2/1949 | Langer | 53/274.8 |
| 2,554,050 A | 5/1951 | Neubeck | 222/23 |
| 2,581,977 A | 1/1952 | Spalding et al. | 219/19 |
| 2,751,732 A | 6/1956 | Woppman | 53/180 |
| 2,766,809 A | 10/1956 | Parham | 154/42 |
| 2,852,898 A * | 9/1958 | Berg | 53/374.8 |
| 2,866,488 A | 12/1958 | Thompson | 150/5 |
| 2,873,883 A | 2/1959 | Schweiter | 221/171 |
| 2,915,866 A * | 12/1959 | Bartlo | 53/552 |
| 2,950,029 A | 8/1960 | Winstead | 222/143 |
| 2,963,838 A | 12/1960 | Harrison et al. | 53/79 |
| 2,999,627 A | 9/1961 | Reinhardt | 229/53 |
| 3,009,498 A | 11/1961 | Fohr | 150/9 |
| 3,052,074 A | 9/1962 | Dreeben | 53/182 |
| 3,070,931 A * | 1/1963 | Zwight | 53/552 |
| 3,082,583 A | 3/1963 | Larson et al. | 53/29 |
| 3,089,298 A | 5/1963 | Neuendorf et al. | 53/112 |
| 3,195,285 A * | 7/1965 | Toss | 53/374.8 |
| 3,234,072 A * | 2/1966 | Dreeben | 53/374.8 |
| 3,253,122 A | 5/1966 | Kochmer et al. | 219/243 |
| 3,256,673 A * | 6/1966 | Tew | 53/551 |
| 3,321,353 A | 5/1967 | Zelnick | 156/499 |
| 3,325,961 A | 6/1967 | Lindh et al. | 53/28 |
| 3,335,540 A | 8/1967 | Reil et al. | 53/28 |
| 3,367,380 A | 2/1968 | Dickey | 150/1 |
| 3,378,988 A | 4/1968 | McClosky | 53/180 |
| 3,381,441 A | 5/1968 | Condo, Jr. et al. | 53/24 |
| 3,387,701 A | 6/1968 | Schneider et al. | 206/46 |
| 3,409,494 A * | 11/1968 | Korzinek | 53/374.8 |

(List continued on next page.)

FOREIGN PATENT DOCUMENTS

| | | |
|---|---|---|
| FR | 72.10525 | 11/1973 |
| GB | 915519 | 1/1963 |
| GB | 978901 | 1/1965 |
| GB | 2253605 | 9/1992 |
| GB | 2 271 753 | 4/1994 |
| JP | 5-77838 | 3/1993 |
| WO | WO 90/08704 | 8/1990 |
| WO | WO 97/19852 | 6/1997 |

*Primary Examiner*—John Sipos
(74) *Attorney, Agent, or Firm*—Baker & Daniels

(57) ABSTRACT

A heat sealing station for forming closely spaced heat seals across a tube of flexible packaging material includes a set of jaws moveable between an open position where the tube is free and a closed a position where the tube is trapped between the jaws. An electrically insulating backing is carried by a first jaw of the set. A pair of closely spaced, curved resistive heat sealing bands are vulcanized onto the backing. The heat sealing bands are energizable to form closely spaced heat seals across the tube when the first jaw is moved towards the tube to bring the backing into contact with the tube and when the heat sealing bands are energized. A backing is also provided on a second jaw of the set that corresponds in shape to the electrically insulating backing.

14 Claims, 5 Drawing Sheets

U.S. PATENT DOCUMENTS

| | | | | |
|---|---|---|---|---|
| 3,482,373 A | | 12/1969 | Morris | 53/112 |
| 3,488,915 A | | 1/1970 | Delastatius | 53/112 |
| 3,492,775 A | | 2/1970 | Rhine et al. | 53/29 |
| 3,508,378 A | * | 4/1970 | Fehr | 53/374.8 |
| 3,538,676 A | | 11/1970 | Runo et al. | 53/182 |
| 3,795,359 A | | 3/1974 | Rausing | 229/7 R |
| 3,849,965 A | | 11/1974 | Dominici | 53/28 |
| 3,889,449 A | | 6/1975 | Membrino | 53/189 |
| 3,925,139 A | * | 12/1975 | Simmons | 53/374.08 |
| 3,982,991 A | | 9/1976 | Hamm et al. | 156/515 |
| 4,027,455 A | | 6/1977 | Rausing et al. | 53/14 |
| 4,041,851 A | | 8/1977 | Jentsch | 93/35 SB |
| 4,115,182 A | * | 9/1978 | Wildmoser | 53/374.8 |
| 4,129,976 A | | 12/1978 | Grundler et al. | 53/552 |
| 4,235,064 A | | 11/1980 | Wenger | 53/451 |
| 4,294,362 A | | 10/1981 | Martensson | 206/622 |
| 4,314,558 A | | 2/1982 | Korpman | 128/283 |
| 4,361,235 A | | 11/1982 | Gautier | 206/527 |
| 4,384,440 A | | 5/1983 | Ohlsson | 53/412 |
| 4,406,646 A | | 9/1983 | Jentsch | 493/209 |
| 4,464,156 A | | 8/1984 | Holmstrom | 493/194 |
| 4,534,159 A | | 8/1985 | Kelly | 53/552 |
| 4,566,249 A | | 1/1986 | Schwerdtel et al. | 53/55 |
| 4,580,392 A | | 4/1986 | Lagerstedt et al. | 53/451 |
| 4,583,352 A | | 4/1986 | Heron | 53/570 |
| 4,589,247 A | | 5/1986 | Tsuruta et al. | 53/550 |
| 4,649,696 A | | 3/1987 | Brie et al. | 53/479 |
| 4,697,403 A | | 10/1987 | Simpson et al. | 53/551 |
| 4,718,778 A | | 1/1988 | Ichikawa | 383/100 |
| 4,747,253 A | | 5/1988 | Schulte | 53/433 |
| 4,757,668 A | * | 7/1988 | Klinkel | 53/551 |
| 4,829,745 A | | 5/1989 | Behr et al. | 53/451 |
| 4,829,746 A | | 5/1989 | Schmidt et al. | 53/451 |
| 4,848,063 A | | 7/1989 | Niske | 53/451 |
| 4,861,414 A | | 8/1989 | Vogan | 156/530 |
| 4,869,048 A | | 9/1989 | Boeckmann | 53/451 |
| 4,911,563 A | | 3/1990 | Ciani | 383/89 |
| 4,935,283 A | | 6/1990 | Jamison | 428/174 |
| 4,947,621 A | | 8/1990 | Christine et al. | 53/451 |
| 4,974,732 A | | 12/1990 | Sullivan et al. | 206/610 |
| 4,999,974 A | | 3/1991 | Kovacs et al. | 53/434 |
| 5,018,646 A | | 5/1991 | Billman et al. | 222/107 |
| 5,031,386 A | | 7/1991 | Schneider | 53/551 |
| 5,048,270 A | | 9/1991 | McMahon | 53/551 |
| 5,054,631 A | | 10/1991 | Robbins, III | 215/1 A |
| 5,170,609 A | | 12/1992 | Bullock et al. | 53/434 |
| 5,220,771 A | | 6/1993 | Burns | 53/551 |
| 5,228,782 A | | 7/1993 | Imer | 383/200 |
| 5,235,794 A | | 8/1993 | Center | 53/437 |
| 5,333,758 A | | 8/1994 | Jamison et al. | 222/101 |
| 5,378,065 A | | 1/1995 | Tobolka | 383/9 |
| 5,400,565 A | | 3/1995 | Terminella et al. | 53/133.4 |
| 5,408,807 A | | 4/1995 | Lane, Jr. et al. | 53/551 |
| 5,430,987 A | | 7/1995 | Lane, Jr. et al. | 53/133.8 |
| 5,454,208 A | | 10/1995 | Kawano | 53/410 |
| 5,715,656 A | | 2/1998 | Pearce | 53/451 |
| 5,755,076 A | * | 5/1998 | Otsuka | 53/373.8 |
| 5,761,884 A | | 6/1998 | Tobolka | 53/451 |

* cited by examiner

US 6,539,692 B1

FORM, FILL AND SEAL CONTAINER FORMING APPARATUS

CROSS-REFERENCE TO RELATED APPLICATION

The present application is a continuation-in-part application of U.S. patent application Ser. No. 09/216,607 filed on Dec. 18, 1998 for an invention entitled "Method and Apparatus for Making Containers with Dispensing Spout" now abandoned.

FIELD OF THE INVENTION

The present invention relates to containers and in particular to improvements in a form, fill and seal container forming apparatus.

BACKGROUND OF THE INVENTION

U.S. patent application Ser. No. 09/216,607, the contents of which are incorporated herein by reference, discloses a form, fill and seal container forming apparatus. The apparatus includes a container forming station having a heat sealing and cutting mechanism and a backing plate. The heat sealing and cutting mechanism and backing plate are moveable towards one another to trap a fluid-filled tube therebetween. Once trapped, transverse heat seals an formed across the fluid-filled tube and the tube is cut between the heat seals to form an individual, fluid-filled container. In order to ensure adequate seals are formed, the heat sealing and cutting mechanism and the, backing plate both include aligned heat sealing wires.

During formation of the heat seals, the heat sealing and cutting mechanism and the backing plate are brought together to trap the tube. The heat sealing wires are then energized to form closely spaced heat seals across the tube. Once the heat seals have been formed, a centrally disposed resistive wire on the heat sealing and cutting mechanism is energized to cut the tube between the heat seals thereby to separate the container from the tube. Although this design results in high integrity seals, it has been found that the heat sealing wires on the heat sealing and cutting mechanism and backing plate burn the packaging material in some instances making the containers unsightly. Also, due to the proximity of the heat sealing wires to the centrally disposed resistive wire, insufficient room is provided to overlie the heat sealing wires with Teflon™ tape. Also, when the centrally disposed resistive wire is energized and expands, it has been found that in some instances, the resistive wire moves and contacts one of the heat sealing wires.

Also, in this container forming apparatus, as the containers are formed and separated from the tube, they fall under the influence of gravity into a diverter. The diverter is configured to orient the packages so that they are delivered to a carrier in a desired orientation. Unfortunately, because of the flexibility of the containers and the fact that successive containers fall from the tube at different heights, the containers often rotate by different amounts before reaching the diverter. As a result, the containers contact the diverter differently resulting in differently deformed pouches being received by the carrier. This of course makes it difficult for downstream, equipment to handle the individual containers. As a result, the containers must be reoriented on the carriers to allow the downstream equipment to act on them properly.

It is therefore an object of the present invention to provide improvements to a form, fill and seal container forming apparatus.

SUMMARY OF THE INVENTION

According to one aspect of the present invention, there is provided a heat sealing and cutting station for a container forming apparatus to form heat seals and cuts across a fluid-filled tube of flexible packaging material at longitudinally spaced locations, said heat sealing and cutting station comprising:

a cutting mechanism including a carrier accommodating a resistive wire energizeable to cut said tube when said carrier is in contact with said tube;

a heat sealing mechanism on an opposite side of said tube and being aligned with said carrier, said heat sealing mechanism including a support carrying a pair of resistive bands energizeable to form closely spaced heat seals across said tube when said heat sealing mechanism is in contact with said tube;

a drive operable on said cutting mechanism and said sealing mechanism to move said cutting mechanism and said heat sealing mechanism between retracted positions where the tube is free and extended positions where said tube is trapped between said cutting and sealing mechanisms, said carrier further including tracks extending forwardly thereof and generally matching the shape of said resistive bands; and power supply means to energize said resistive bands and said resistive wire.

According to another aspect of the present invention, there is provided a heat sealing and cutting station for a container forming apparatus to form heat seals and cuts across a fluid-filled tube of flexible packaging material at longitudinally spaced locations, said heat sealing and cutting station comprising:

at least one set of jaws moveable between a fully open position where said tube is free and a closed position where said tube is trapped between said jaws;

a heat sealing mechanism carried by said jaws to form a heat seal across the tube when said jaws are in said closed position;

a cutting mechanism carried by the jaws to cut the tube along the heat seal when the jaws are in the closed position to separate a container from the end of the tube; and a container holding mechanism carried by the jaws, said container holding mechanism holding said container when said jaws begin moving from the closed position towards the fully open position in a manner to allow the container to rotate and take a desired orientation before said container is released.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
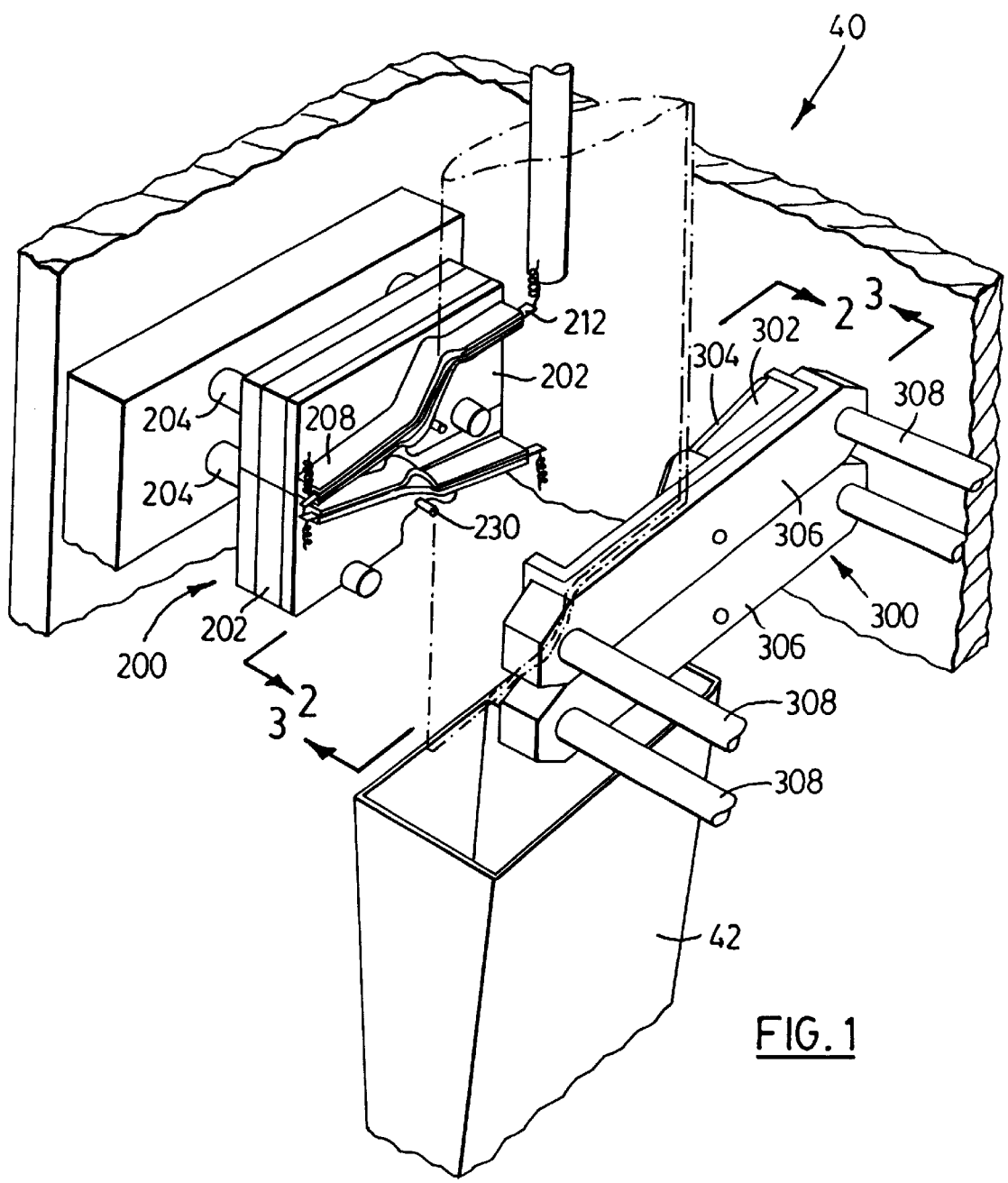
FIG. 1 is a perspective view of a container forming station forming part of a form, fill and seal container forming apparatus in accordance with the present invention.
Figure 2:
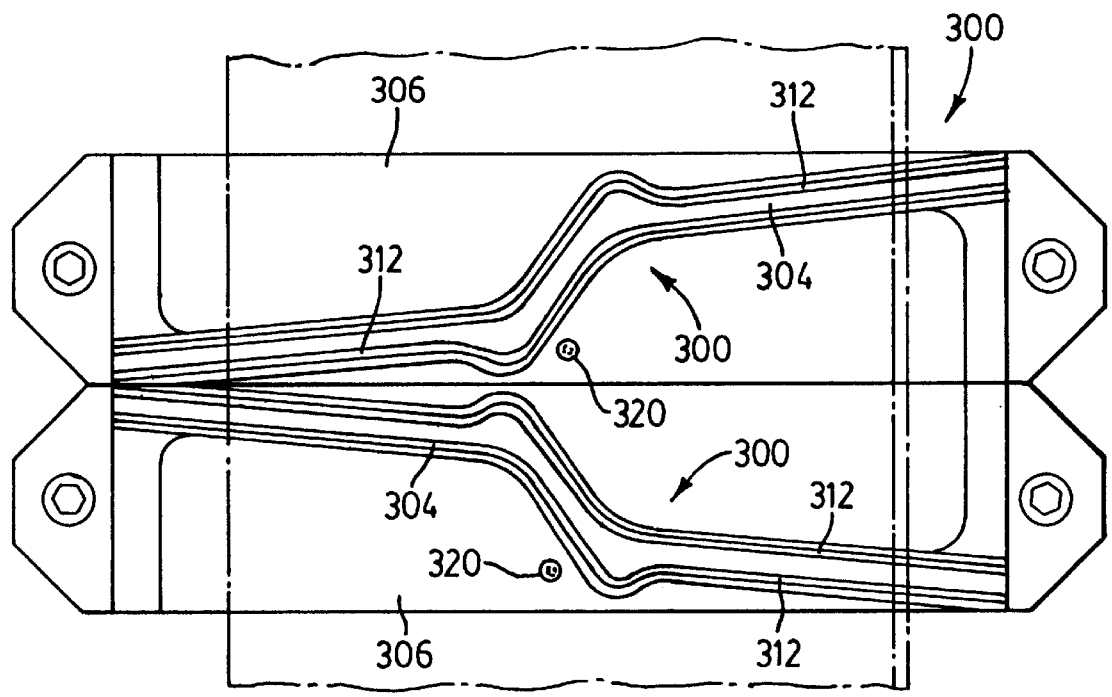
FIG. 2 is a side elevational view of upper and lower sealing mechanisms forming part of the container forming station of FIG. 1 taken in the direction of arrow 2.
Figure 3:
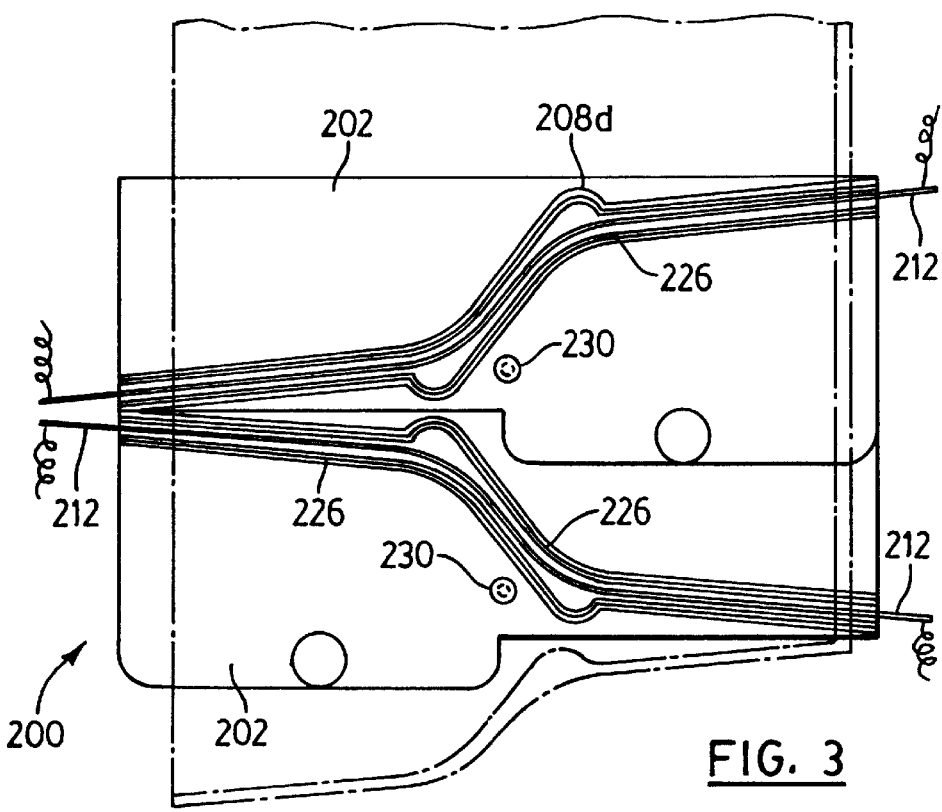
FIG. 3 is a side elevational view of upper and lower cutting mechanisms forming part of the container forming station of FIG. 1 taken in the direction of arrow 3.
Figure 4:
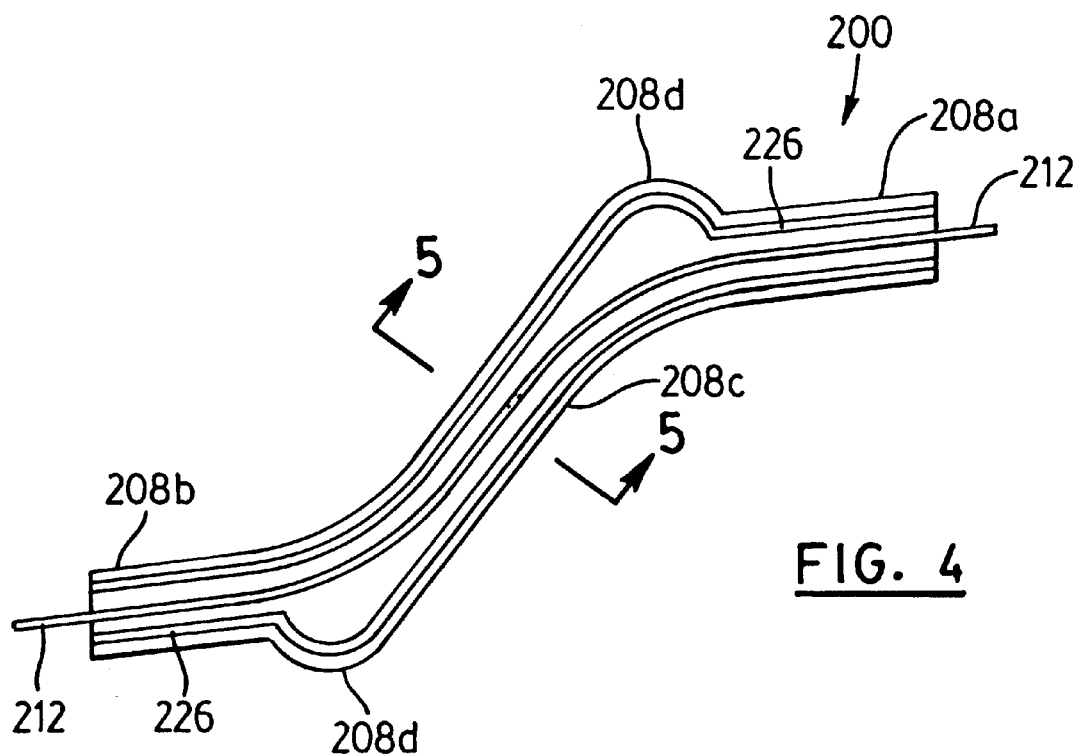
FIG. 4 is it side elevational view of an upper cutting mechanism of FIG. 3 with the support omitted.
Figure 5:
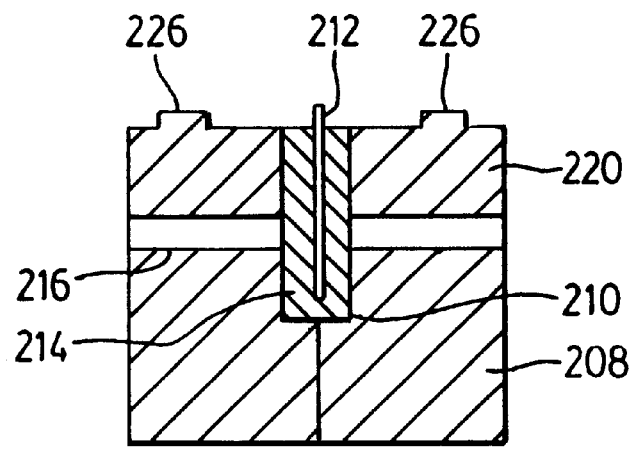
FIG. 5 is a cross-sectional view of FIG. 4 taken along line 5—5.
Figure 6:
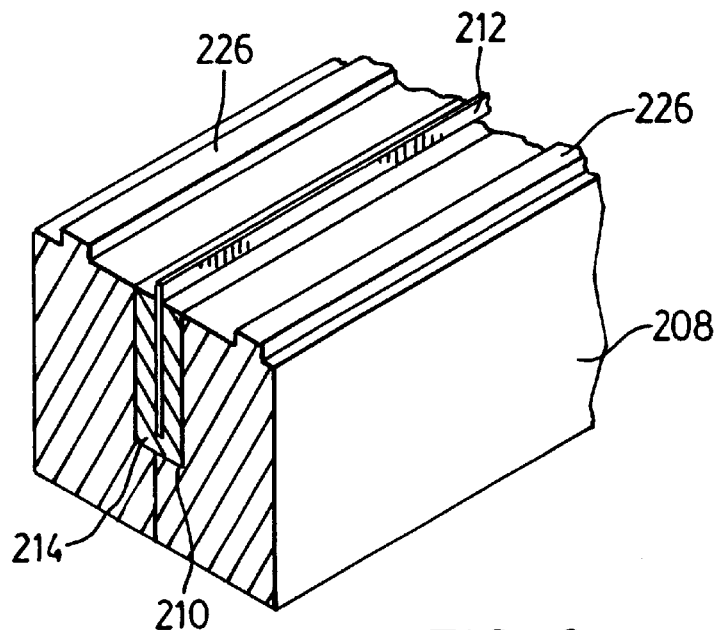
FIG. 6 is a cross-sectional view of FIG. 4 in perspective.
Figure 7:
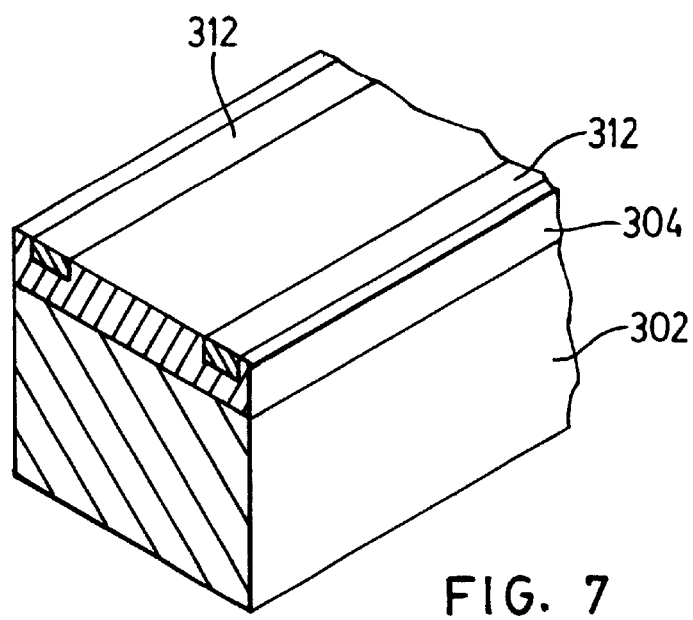
FIG. 7 is a cross-sectional view of FIG. 2 in perspective.
Figure 8:
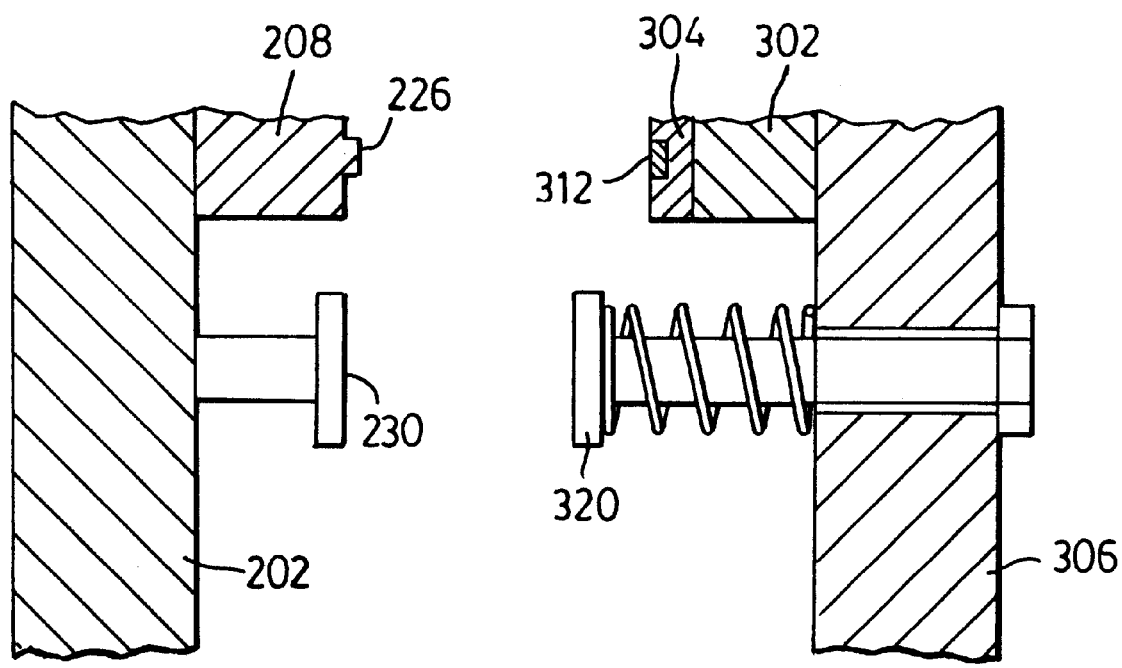
FIG. 8 is a cross-sectional view of a portion of the container forming station of FIG. 1.

Turning now to FIGS. 1 and 3, a container forming station to form longitudinally spaced heat seals across a fluid-filled tube of packaging material, which define opposite sides of containers, and to cut the tube along the heat seals to separate individual containers from the tube is shown and is generally identified by reference numeral 40. The heat seals are configured so that successive containers formed from the tube of packaging, matters are alternately oriented and interlocked to reduce packaging material waste. As can be seen, the container forming station 40 includes upper and lower cutting mechanisms 200 positioned on one side of the tube of packaging material. The cutting mechanisms are moveable between retracted and extended positions. Each cutting mechanism 200 is mounted on a support 202 secured to cam driven shafts 204 forming part of a drive mechanism (not shown).

One of the cutting mechanisms 200 is better illustrated in FIGS. 3 to 6. As can be seen, the cutting mechanism 200 includes a curvilinear carrier 208 constituted by a air of nested parts. A central longitudinal groove 210 is defined between the parts. The carrier 208 is formed of hard anodized aluminum to render the carrier non-electrically conductive. The separate nested parts facilitate anodization of the aluminum within the groove 210. The carrier 208 is generally in the shape of a "lazy-S" having upper and lower arms 208a and 208b respectively joined by bridge 208c. Bulges 208d are provided at the turns and define opposed projections within the spouts of containers formed from the tube. Positioned in the groove 210 is an electrically conductive resistive ribbon 212 such as that manufactured by Toss Machine Components of Nazareth, Pa. The resistive ribbon 212 is turned on its side with its leading edge extending slightly beyond the front face of the carrier 208. Insulating material 214 surrounds the ribbon 212 within the groove 210 to isolate electrically the carrier 208 and the ribbon. A fastener (not shown) formed of electrically non-conductive material is accommodated by a passage 216 extending through the width of the carrier 208 adjacent its midpoint to secure the ribbon 212 to the carrier. The free ends of the ribbon 212 extend beyond the ends of the carrier 208 and are connected to an electrical power supply (not shown) to allow the central ribbon 212 to be energized.

Laterally spaced track 226 extend from the front face of the carrier 208 on opposite sides of the resistive ribbon 212. The tracks 226 run the length of the carrier 208 and follow its opposed side edges. A post 230 extends forwardly of the support 202 adjacent the lower bulge 208d of the carrier. The forward face of the post is generally in line with the front face of the carrier 208.

On the opposite side of the tube of packaging material and in line with the cutting mechanisms 200 are corresponding upper and lower sealing mechanisms 300. Each sealing mechanism 300 is aligned with and corresponds in shape to a respective one of the cutting mechanisms 200. Each sealing mechanism 300 includes an anvil 302 mounted on a support 306 and having a rubber strip 304 secured to its outer surface. Each support 306 is secured to cam driven shafts 308 forming part of the drive mechanism (not shown).

The rubber strip 304 is vulcanized on the anvil 302. Vulcanized on the forward surface of the rubber strip 304 are two spaced-apart metallic, heat sealing resistive bands 312. The ends of the bands 312 are connected to an electrical power supply (not shown) to allow the resistive bands to be energized. The shapes of the resistive bands 312 match the shapes of the tracks 226 on the carrier 208. In this manner, the tracks 226 on the carrier 208 provide a solid backing surface for the heat sealing resistive bands 312 on the rubber strip 304. A spring loaded finger 320 extends from the support 306 beyond the forward surface of the rubber strip 304 and is aligned with the post 230 extending from the support 202. The post 230 and spring loaded finger 320 hold the tube below the carrier 208 and anvil 302 when the cutting mechanism 200 and sealing mechanism 300 are extended to trap the tube of packaging material therebetween.

During operation, when it is desired to form heat seals and cuts across the tube of packaging material at longitudinally at spaced locations, the cutting mechanism 200 is moved from retracted position to an extended position to contact the tube. The corresponding sealing mechanism 300 is also moved to the extended position so that the tube is trapped therebetween. At this time, the electrical power supply connected to the heat sealing resistive bands 312 on the rubber strip 304 is energized to form closely spaced heat seals across the tube. The tracks 226 extending from the carrier 208 allow sufficient pressure to be applied to the tube of packaging material during seal formation resulting in high integrity seals being formed. Once the heat seals have beet formed, the centrally disposed resistive wire 212 on the carrier 208 is energized to sever the tube between the heat seals created by the resistive bands 312. At this stage, the cutting mechanism 200 and sealing mechanism 300 are retracted allowing the packaging material along the sever line to vaporize.

As the cutting mechanism 200 and sealing mechanism 300 are moved apart, the post 230 and spring loaded finger 320 remain in contact to hold the container formed at the end of the tube. The positions of the post and spring loaded finger result in the container rotating to an upright position under the influence of gravity while still being held by the post and spring loaded finger. Further movement of the cutting mechanism and sealing mechanism away from one another finally brings the post 230 and spring loaded finger 320 out of contact thereby releasing the container and allowing the container to fall under the influence of gravity. As the container falls, the container is received by a curved chute 42 positioned below the container forming station 40. The curved chute delivers the container to an inclined conveyor (not shown), which in turn delivers the container to a carrier. The carrier carries the container to downstream equipment for further processing.

Since each container is held by the container forming station after it has been formed in a manner to allow the carrier to orient itself, the orientations of containers delivered to downstream equipment can be controlled in a highly predicable fashion. This of course facilitates downstream processing of the containers.

Although a preferred embodiment of the present invention has been described, those of skill in the art will appreciate that modifications and variations may be made without departing from the spirit and scope thereof as defined by the appended claims.

I claim:

1. A heat sealing and cutting station for a container forming apparatus to form heat seals and cuts across a fluid-filled tube of flexible packaging material at longitudinally spaced locations, said heat sealing and cutting station comprising:

at least one set of jaws moveable between a fully open position where said tube is free and a closed position where said tube is trapped between said jaws;

a heat sealing mechanism carried by said jaws to form a heat seal across the tube when said jaws are in said closed position;

a cutting mechanism carried by the jaws to cut the tube along the heat seal when the jaws are in the closed position to separate a container from the end of the tube; and a container holding mechanism carried by the jaws, for holding said container after said jaws begin moving from the closed position towards the fully open position and for allowing the container to rotate and take a desired orientation before said container is released by said container holding mechanism.

2. A heat sealing and cutting mechanism as defined in claim 1 wherein said holding mechanism includes a post on a first jaw of said set and a spring loaded finger on a second jaw of said set, said spring loaded finger contacting said post when said jaws in the closed position thereby to trap the packaging material and hold said container.

3. A heat sealing mechanism to form curved heat seals across a tube of flexible packaging material comprising:

a carrier movable towards said tube;

an electrically insulating backing on said carrier; and a pair of closely spaced, curved resistive heat sealing bands on said backing, said heat sealing bands being energizeable to form closely spaced, curved heat seals across said tube when said carrier is moved towards said tube to bring said backing into contact with said tube and when said heat sealing bands are energized, wherein said heat sealing bands are vulcanized onto said backing to counteract the tendency for said heat sealing bands to straighten during energization of said heat sealing bands and thereby maintain the curved shape of said heat sealing bands.

4. A heat sealing mechanism as defined in claim 3 wherein said backing is a rubber strip on said carrier.

5. A heat sealing mechanism as defined in claim 4 wherein said curved heat sealing bands have a "lazy-S" shape.

6. A heat sealing mechanism as defined in claim 5 wherein each curved heat sealing band runs along an opposite side edge of said rubber strip.

7. A heat sealing mechanism as defined in claim 3 wherein said curved heat sealing bands have a "lazy-S" shape.

8. A heat sealing mechanism as defined in claim 7 wherein each curved heat sealing band runs along an opposite side edge of said backing.

9. A heat sealing station for forming closely spaced heat seals across a tube of flexible packaging material comprising:

a set of jaws moveable between an opened position where said tube is free and a closed position where said tube is trapped between said jaws;

an electrically insulating backing on a first jaw of said set;

a pair of closely spaced, curved resistive heat sealing bands on said backing, said heat sealing bands being energizable to form closely spaced heat seals across said tube when said first jaw is moved towards said tube to bring said backing into contact with said tube and said heat sealing bands are energized, wherein said heat sealing bands are vulcanized onto said backing to counteract the tendency for said heat sealing bands to straighten during energization of said heat sealing bands and thereby maintain the curved shape of said heat sealing bands; and a backing on a second jaw of said set corresponding in shape to said electrically insulating backing.

10. A heat sealing station as defined in claim 9 wherein said electrically insulating backing is a rubber strip on said carrier.

11. A heat sealing station as defined in claim 10 wherein said curved heat sealing bands have a "lazy-S" shape.

12. A heat sealing station as defined in claim 11 wherein each curved heat sealing band runs along on opposite side edge of said rubber strip.

13. A heat sealing station as defined in claim 9 wherein said curved heat sealing bands have a "lazy-S" shape.

14. A heat sealing shape as defined in claim 13 wherein each curved heat sealing band runs along an opposite side edge of said backing.

\* \* \* \* \*